(12) United States Patent
Soto et al.

(10) Patent No.: US 10,554,308 B2
(45) Date of Patent: Feb. 4, 2020

(54) SYSTEM AND METHOD FOR COMMUNICATION BY MEANS OF VISIBLE LIGHT FOR UNDERGROUND TUNNELS

(71) Applicant: Universidad de Santiago de Chile, Santiago (CL)

(72) Inventors: Ismael Soto, Santiago (CL); Carolina Lagos, Santiago (CL)

(73) Assignee: Universidad de Santiago de Chile (CL)

( * ) Notice: Subject to any disclaimer, the term of this patent is extended or adjusted under 35 U.S.C. 154(b) by 0 days.

(21) Appl. No.: 16/067,591

(22) PCT Filed: Dec. 28, 2016

(86) PCT No.: PCT/CL2016/050077
§ 371 (c)(1),
(2) Date: Jun. 29, 2018

(87) PCT Pub. No.: WO2017/113028
PCT Pub. Date: Jul. 6, 2017

(65) Prior Publication Data
US 2019/0007143 A1    Jan. 3, 2019

(30) Foreign Application Priority Data
Dec. 30, 2015 (CL) .................................. 3778-2015

(51) Int. Cl.
*H04B 10/00* (2013.01)
*H04B 10/588* (2013.01)
(Continued)

(52) U.S. Cl.
CPC ......... *H04B 10/588* (2013.01); *H04B 10/116* (2013.01); *H04B 10/502* (2013.01)

(58) Field of Classification Search
CPC . H04B 10/116; H04B 10/112; H04B 10/1123; H04B 10/1125; H04B 10/1127;
(Continued)

(56) References Cited

U.S. PATENT DOCUMENTS 9,083,449 B2    7/2015  Drost
2010/0135671 A1*  6/2010  Park ................... H04B 10/1141
                                                         398/172
(Continued)

FOREIGN PATENT DOCUMENTS

| CN | 105099551 | 11/2015 |
| EP | 1865631 B1 | 4/2011 |
| WO | 2017113028 A1 | 6/2017 |

OTHER PUBLICATIONS

International Search Report, PCT/CL2016/050077, dated Apr. 10, 2017.

*Primary Examiner* — Hanh Phan
(74) *Attorney, Agent, or Firm* — Tolpin & Partners PC; Thomas W. Tolpin

(57) ABSTRACT

The invention relates to a system for communication by means of visible light and to the corresponding method, where a channel for transmitting visible light has abnormal conditions, for example, in tunnels of an underground mine with a high degree of dust concentration in the atmosphere and also in rural and urban tunnels in which the fumes generated by an accident produce high concentrations of powdery material in the transmission channel. This problem is solved by using in the system a transceiver for transmitting visible light, a means for receiving visible light, and a Deep Neural Network (DNN), with a specific arrangement, proximity or distance, of ceiling-mounted transceivers formed by LEDs lamps (arrangement of the plurality of LEDs) and Digital Single Lens Reflex (D-SLR) transceivers (formed by reflex cameras in which the lens that forms the (Continued)

image also provides the image in the viewfinder). According to the invention, together all the elements forming the system allowing channel noise to be removed, being able to transmit using visible light with diversity, even if the channel appears interrupted to the human eye.

3 Claims, 6 Drawing Sheets

(51) Int. Cl.
*H04B 10/116* (2013.01)
*H04B 10/50* (2013.01)
(58) Field of Classification Search
CPC .............. H04B 10/114; H04B 10/1143; H04B 10/1149
USPC ....... 398/172, 118, 119, 127, 128, 130, 131, 398/129, 115, 183, 188, 135, 136, 158, 398/159, 202, 208, 209
See application file for complete search history.

(56) References Cited

U.S. PATENT DOCUMENTS

| 2011/0229147 A1* | 9/2011 | Yokoi | ................... H04B 10/116 398/172 |
| 2014/0178080 A1* | 6/2014 | Chen | ..................... H04B 10/116 398/172 |

* cited by examiner

Previous Art

SYSTEM AND METHOD FOR COMMUNICATION BY MEANS OF VISIBLE LIGHT FOR UNDERGROUND TUNNELS

TECHNICAL FIELD OF THE INVENTION

The present invention relates to a communication system and a communication method, using visible light for the transmission of information. Specifically, the present invention relates to a communication system and a communication method, wherein the visible light transmission channel has abnormal conditions. For example, in mining tunnels with high concentration of dust in the environment, and in addition, in rural and urban tunnels, where the smoke that could be produced by some kind of accident, produces high concentrations of pulverulent material in the transmission channel.

Background of the Invention

The communication systems that use visible light (VLC), have been very successful, due to the rapid development of different types of lighting or light emission, such as light emitting diodes (LEDs, Light Emitting Diodes) or similar. This allows to develop data communication means in a more comfortable way, at a higher speed, and also, using infrastructures that include interior and exterior lighting.

The triple functionality provided by VLC (lighting, data and location) has created a wide range of interesting applications, including home networks, high-speed data communication through office lighting infrastructures, car-to-car communications, high-speed communication in aircraft and train cabins, to name a few. Recent research at VLC has shown that data transmission would reach 500 Mbps through short links in office and home environments.

In addition, this technology is considered one of the most promising alternatives to radio frequency systems, since it does not suffer from electromagnetic interference, is open source, and is perfect for closed or open environments such as streets, in different types of buildings, such as hospitals, and in airplanes and ships, or other means of transport or moving machinery.

In recent years, technology based on visible light communications has been introduced; the use of LEDs to transmit data at high speeds. Recent developments have allowed LED devices to have high efficiency and brightness, to be used as the main source of transmission in conventional VLC systems with speeds that can reach hundreds of Mbps. FIG. 1, which represents the state of the art, shows a block diagram of LED based system, according to the publication of CSNDSP 2014 entitled "A New Location System for an Underground Mining Environment Using Visible Light Communications", (Iturralde et al.). This publication proposes a modulation by intensity and direct detection of VLC technology (IM-DD) using 3 LEDs, as a monitoring system within underground mines, by sending data between readers and sensors in real time. An O/E photo-detector is used on the receiver side to detect the optical signal, which results in an equivalent electrical current.

In the publication Iturralde et al. (2014), a case study was presented to a system that centralizes in a server the management of the positioning of people in a mine using radio frequency inside the mine. Because the existing positioning technologies, such as global positioning systems (GPS) are not very useful in indoor applications and less in a mine, since the satellite signal is easily blocked by the land and the receiver cannot receive the signal from the satellites, so it is useless for indoor positioning.

Several technologies based on RFID tags have been proposed for indoor location in underground mines. It has been proposed to use RFID tags to perform localization tasks and the proposed algorithm is known as the Landmarc location identification algorithm based on active RFID calibration. In order to increase the accuracy and without the placement of more RFID readers, the Landmarc algorithm, employs the idea of having the location reference tags extra, but fixed to help the calibration location. These reference labels serve as reference points in the system, so that the system is more profitable, since RFID readers are very expensive. Other applied techniques are the angulation technique, and the Landmarc algorithm with virtual labels. In addition, an advanced Landmarc algorithm with many neighboring tags has been proposed, and there is also the least squares approach that was carried out to estimate the starting position of the device through the use of RFID tags; while in other publications, the use of RFID tags to trace a mobile element inside an underground mine is shown. In addition, publications have been found with the use of ZigBee technology in conjunction with RFID, for devices within the range of mine location.

As mentioned above, while RFID-based location technologies offer reliable performance in indoor applications, there are certain drawbacks with these technologies that place a limitation to their use. Conventional indoor positioning systems, such as wireless local area network (WLAN), RFID, Bluetooth, and ultrasound have a number of problems. The most common problems are due to system instability, long response time, and low accuracy.

Although LEDs are the most successful for the emission of light in high-speed optical data transmission, other light emitting devices are available, including laser diodes (LDs, Laser Diodes) or super-luminescent diodes (SLDs, Super Luminescent Diodes), which offer a response feature faster and cheaper.

However, when one has a normal environment or transmission channel and it is clean for light, it is possible to perform data communications at high speed using visible light, because the bandwidth depends on the response speed of the transmitting light diode in the optical communication, the communications channel and the simplicity of the receiver. However, when the environment or transmission channel presents adverse conditions for this type of communication, it is difficult to install it in adverse conditions such as tunnels in an underground mine, or even in rural or urban tunnels such as underground motorways. where, for example, an automobile accident can generate a lot of smoke, and therefore, communication through visible light has no possibility of being applied.

To maintain the bandwidth in adverse conditions, a technique is needed to transmit and stably receive a large amount of data in a light emitting signal of a light emitting device, depending on the communication channel, for example, in a tunnel of an underground mine.

In the state of the art there has been only one attempt to solve this problem, but the inventors have not been successful. Document CN 103297137 dated Sep. 11, 2013, titled "LED visible light wireless communication system used in mine" (Chen et al.) describes a communication system through visible light, which uses LEDs as a source of light, and that can be used in a mine. The system comprises a means for I/O signal processing, a system receiving means, a light emitting means, a chip set for the master control, and a control part through a software. The system comprises LEDs in a mine, one LED in the head. The communication system that uses visible light by means of LEDs, is based on a design scheme of a circuit that integrates a programmable system at very high scale, adopting a communication method that combines a UWB (Ultra-Band Width), a wireless communication technology and a visible light communication technology through LEDs. It is indicated in this document, that the system can not only give reliability of communication through visible light communication technology using LEDs, which will prevent the influence of excessive dust in the mine, so that an optical detector is prone to be contaminated, but also has the advantage of bringing visible light to the green spectrum in lighting, expanding coverage and transmission capacity, at high modulation speed.

In the description of the invention of document CN 103297137, it is pointed out that the frequency bandwidth of visible light using LEDs is 430 THz at 750 THz, allows to achieve a good visible light communication, with a wide coverage. However, due to the complexity of the conditions of an underground mine, the wavelength of communication of visible light using LEDs can be altered, due to the atmosphere in the underground tunnel that is full of dust, which generates problems in the transmission channel. This is due to the fact that since gas molecules of similar or smaller size, produce scattering of light and absorption caused by attenuation of the severe signal, in different positions of the LEDs and other background equipment of rays, will also have an impact on the performance of the system, resulting in the confidence of the communication system is very low, when it is used in an underground mine. The system uses a multi-band orthogonal frequency division and a multiplex communication mode with wireless communication technology (MB-OFDM) UWB and visible light communication technology of LEDs that combines programmable VLSI chips and the technology of Software control to solve the current underground wireless communication system, to solve the reliability problems. Wireless communication technology to transmit data signals by UWB (Ultra Broadband) sends nanosecond pulses with high speed, high performance, low power consumption, and low cost, easy to digitize and many other advantages, and does not require of a routine system for the inverter, frequency synthesizers, filters and other analog devices, while at the receiving end it does not need filters, RF/IF converter and local oscillator and other complex components, which helps reduce costs. However, the traditional transmission distance of the UWB pulse carrier technology is short. The transmission speed is 100 Mbps, its effective range is only 10 meters, and the transmission utilization distance is very limited in the mine. The system of wireless communication through visible light and using LEDs, includes an input/output (I/O) signal in a part of the processing, a part of the receiver, a part of the transmitter of a chip set, and a software of control as a main part. The system hardware includes one LED lamp and LED headlights. LED lamps in the LED headlights and a photo-detector built and that are a receiving antenna in miniature. In addition, this system has an optical photo-detector-electrical conversion, for the detection and synchronization of the intensity of visible light. If the signal is too weak, a micro processing unit (MCU) through a selector automatically switches to UWB wireless communication mode, by transmitting and receiving antennas that complete the communication. If provided by LED visible light with light pulse frequencies of 500~800 MHz, the micro processing unit (MCU) automatically switches to a UWB modulated wireless communication mode using frequency pulses.

An automatic gain control system (AGC) is designed to ensure the reliability of communications, so that when the light detector detects that the intensity of the light reaches a threshold value of use, the UWB wireless communication automatically switches over the MCU LED visible light communication and vice versa.

Therefore, document CN 103297137, the micro processing unit (MCU) by means of the selector automatically changes, from a transmission through visible light, if the signal in the underground tunnel is too weak, switching the communication to wireless mode to be able to guarantee a transmission of information to a UWB bandwidth inside the tunnel.

Given the previous analysis, document CN 103297137 does not solve the problem of the transmission of data by means of visible light, when the environment of the tunnel or the transmission channel has a high density of dust, since it requires an additional system by wireless transmission to effect communication when the environment or transmission channel has problems of high dust density, to create a stable signal. Strictly speaking, the communications system of document CN 103297137 requires two modes of transmission: 1) by visible light using LEDs when the environment is clean; and 2) by means of a wireless mode to be able to guarantee an information transmission, when the environment or transmission channel is with an excess of noise. In addition, in CN 103297137 discloses a structure for transmitting different data by controlling the light emission of a series of light sources having different spectra. The structure for transmitting data by mapping digital values (1, 0) to phase changes in a transmission timing of a pulse width modulation signal (PWM, Pulse Width Modulation, pulse width modulation).

As indicated above, in the state of the art, only document CN 103297137, the only that addresses the problem of communication through visible light in a mining tunnel when the communication channel—the mining tunnel—creates problems of uncertainty in the reliability of the data. Therefore, the problem of using the same communication system through visible light, when the transmission channel has too much noise, is a problem that was not resolved in said document, because another system of communication is required communication (backup system) to give continuity to communication.

The rest of the documents in the state of the art, such as CN 103297137; CN 101938310; CN 104243033; CN 104243034; US 2012230703; KR 20080104731; CN 104092518; CN 203722642; CN 103384169; US 2014314421; US 2015086213; US 2015132006; KR 20150017861; CN 103199923; and JP 2015015723 refers to different problems to equalize or clean data. However, they do not leave them as clean as to be close to transmission of visible light at surface level.

SUMMARY OF THE INVENTION

The invention relates to a system for communication by means of visible light and to the corresponding method, where a channel for transmitting visible light has abnormal conditions, for example, in tunnels of an underground mine with a high degree of dust concentration in the atmosphere and also in rural and urban tunnels in which the fumes generated by an accident produce high concentrations of powdery material in the transmission channel. This problem is solved by using in the system a transceiver for transmitting visible light, a means for receiving visible light, and a Deep Neural Network (DNN), with a specific arrangement, proximity or distance, of ceiling-mounted transceivers formed by LEDs lamps (arrangement of the plurality of LEDs) and Digital Single Lens Reflex (D-SLR) transceivers (formed by reflex cameras in which the lens that forms the image also provides the image in the viewfinder). According to the invention, together all the elements forming the system allowing channel noise to be removed, being able to transmit using visible light with diversity, even if the channel appears interrupted to the human eye.

BRIEF DESCRIPTION OF THE DRAWINGS

The accompanying drawings are included to provide more understanding of the invention, and are part of this description. They also illustrate one of the preferred embodiments of this invention.

DESCRIPTION OF THE INVENTION

The present invention relates to a communication system through visible light and a method of communication through visible light, where the visible light transmission channel, has abnormal conditions, for example in tunnels of an underground mine with high degree of dust concentration in the environment, and also, in rural and urban tunnels, where the smoke that could be generated by some type of accident, produces high concentrations of pulverulent material in the transmission channel. This problem is solved by using a transceiver of visible light transmission, a means of receiving visible light and a Deep Neural Network (DNN), with a certain arrangement, proximity or distance, of ceiling transceivers consisting of LEDs lamps (arrangement of a multiplicity of LEDs) and Digital-Single Lens Reflex or D-SLR (formed by reflex cameras where the lens form the image that is also provided as an image to the viewfinder), where along with all the elements of the system, allow to clean the noise of the channel, therefore being able to transmit with visible light with diversity, although to the human eye said channel seems interrupted.

The communications channel of the information transmission system by the visible light technique is the environment of a tunnel of an underground mine, a tunnel of rural and urban highways, with an excess of smoke. The noise in the transmission channel creates a non-linear process, due to the fact that said communications channel, under the conditions previously indicated, represents the angular technical problem for these unresolved cases in the state of the art, which allows using the transmission of light visible in a correct way, implementing in the solution a Neural Network (DNN) system, which allows to improve the bandwidth, inside a tunnel with excessive noise, inside an underground tunnel, for example a tunnel in an underground mine.

The present invention considers modelling the visible light channel in an underground tunnel, such as, for example, the tunnel of an underground mine. For this, first, is necessary to have a grid on the tunnel floor to take the measurements, as exemplified in FIG. 2. The square section to be measured will be delimited and subdivided into grids of 20 cm on each side. This allowed to obtain the values in each vertex, which is uniform. Since the conditions of the tunnels include unevenness for drainage and ground penetration, it is necessary to consider a possible unevenness of the terrain.

Figure 3:
FIG. 3 shows a snapshot of the LED installation and a detail of the ground in the tunnel of an underground mine with compacted material.

FIG. 3 shows the installation procedure of the LED, as well as the tunnel floor made of compacted material. That is why the distance of each vertex must be measured with the light source, to compensate in this way the error resulting from a possible unevenness. Experimental tests were carried out using different powers of LEDs, such as LEDs of 50 W, 30 W, and 10 W. The values of intermediate power and size of the grid are the conditions that must be taken into account, depending on the tunnel terrain. For the method, is necessary to have the values of humidity and temperature, which are variables to consider when designing the means of communication.

Figure 1:
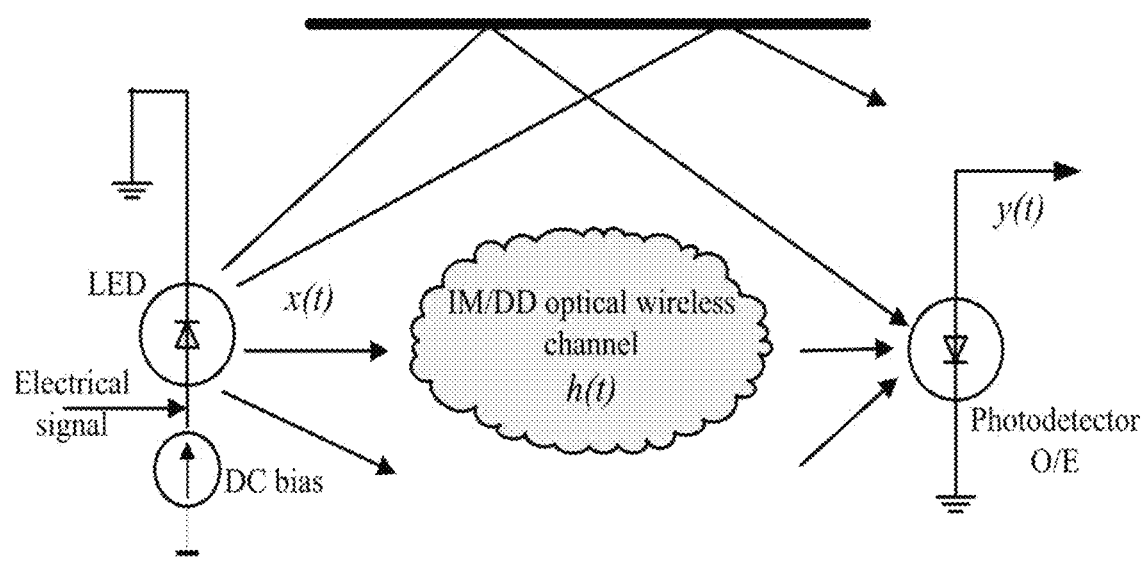
FIG. 1 shows a general scheme of a IM/DD optic system from the previous art.
Figure 2:
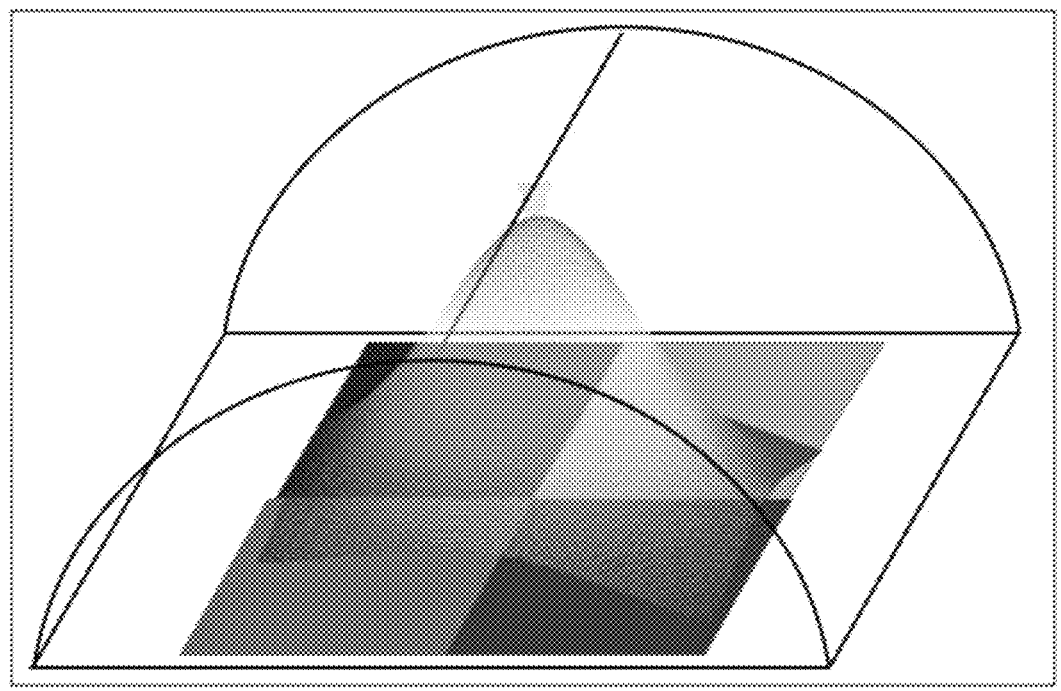
FIG. 2 shows a LED distribution model and the quadrants in the ground of the underground mine, created from an ideal curve.

FIG. 2 also shows the distribution model, from the ideal curve in a 3D space. Therefore, it can be divided into 4 equal parts with respect to the XY plane (ground plane). Having these two considerations in mind, is possible to only measure the quadrant of the illuminated ground of the light source in the underground mine. Each quadrant is represented at ground level with different colors.

The underground tunnel in a mine, can have dimensions close to 8-10 meters wide, and a height from 5 to 8 meters. Considering most of possible cases in an underground tunnel, an underground mine presents a symmetry that allows it to be divided into four parts as shown in FIG. 2. This division will depend on each of the distance between the walls and the ceiling of each tunnel.

Figure 4:
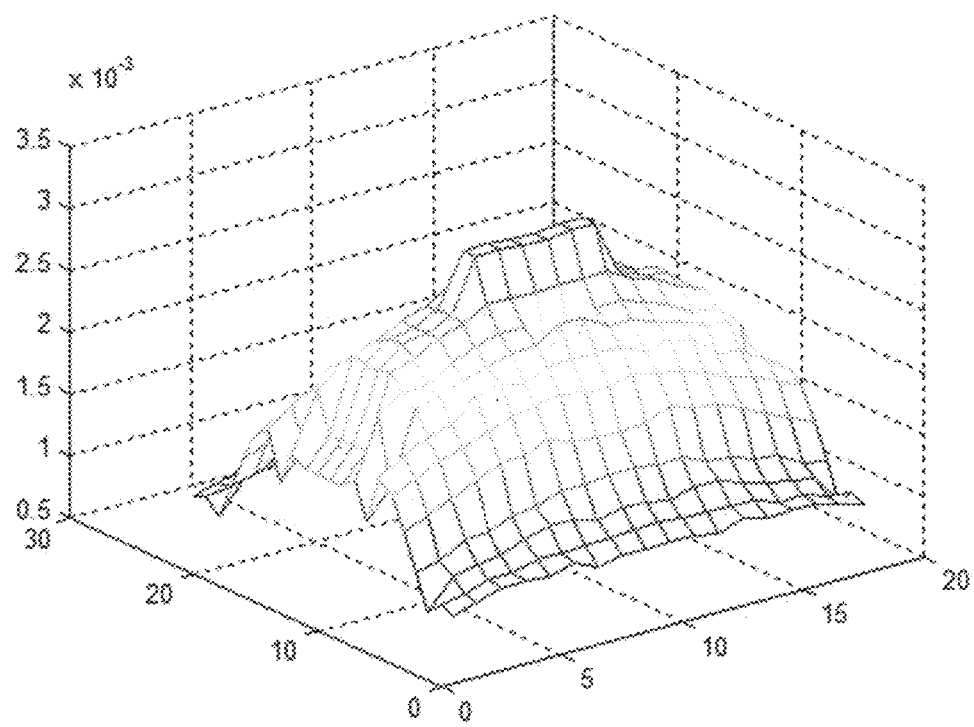
FIG. 4 shows the distribution of power in lumens in a cell of the underground tunnel

FIG. 4 shows the power distribution in a cell; x and y axes are coordinates in meters, and the z axis represents the power received in the luxometer. The ground measurements considered a set of three arranged along the tunnel.

It will be assumed that a tunnel can be represented by a succession of cells and that power distributions can be concatenated with the purpose of covering a tunnel or the whole of the mine.

Figure 5:
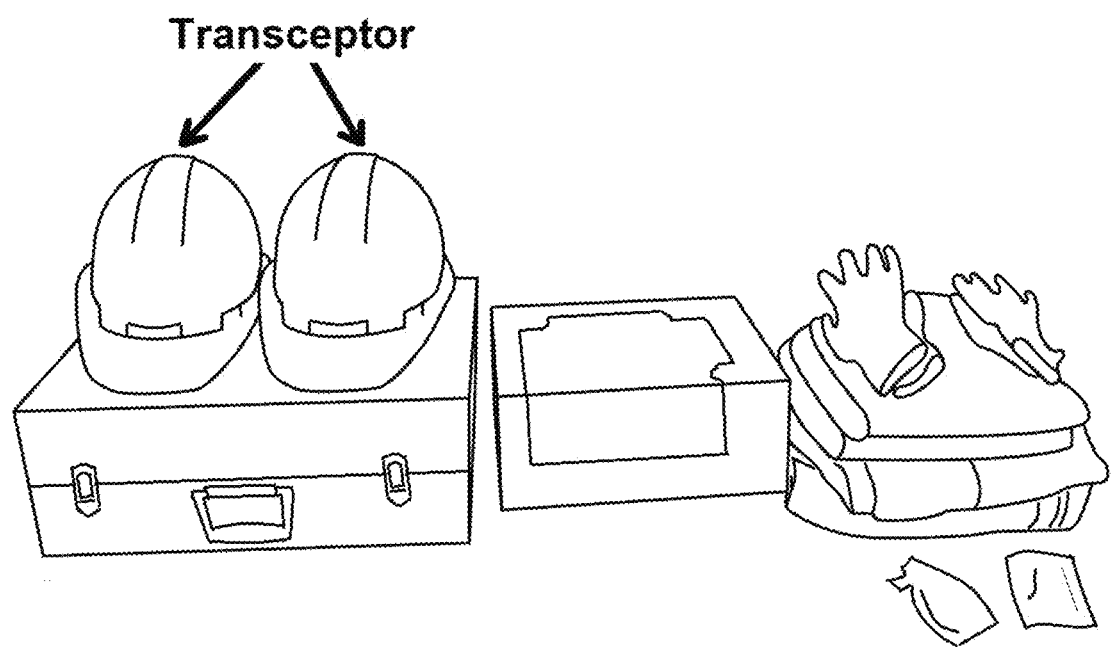
FIG. 5 shows the main elements a mining worker needs where transceiver are mounted, in one of the arrangements of the present invention.

To achieve data transmission through a visible light channel in an underground tunnel, at least one LED lamp located on the roof of the mine is required. FIG. 5 shows the safety hats and jackets where transceivers can be mounted. They can also be placed in vehicles used inside the tunnel. These transceivers will send the signal to the roof of the mine, in direct line from the light generated in the objects mentioned and the transceivers located in the roof, that is, from the transceiver of the hull the transmission is sent to the transceivers must be located in the upper part of the roof of the tunnel, as shown in FIG. 6.

On the other hand, in the case of a vehicle, the receiver must be placed on the roof, and in case of any other stationary element, the receiver must be placed in an area within the direct line of sight to the emitters or at least where is not in complete darkness. It is therefore necessary to take into account the proximity or remoteness of the roof transceivers, to avoid that there are no unlit places, or, to withstand adverse conditions within a tunnel or communication channel.

In the case of the Up-link as mentioned below, each of these transmitters will have three different carrier frequencies corresponding to the RGB colors, by the use of the "Shutter" effect.

Figure 6:
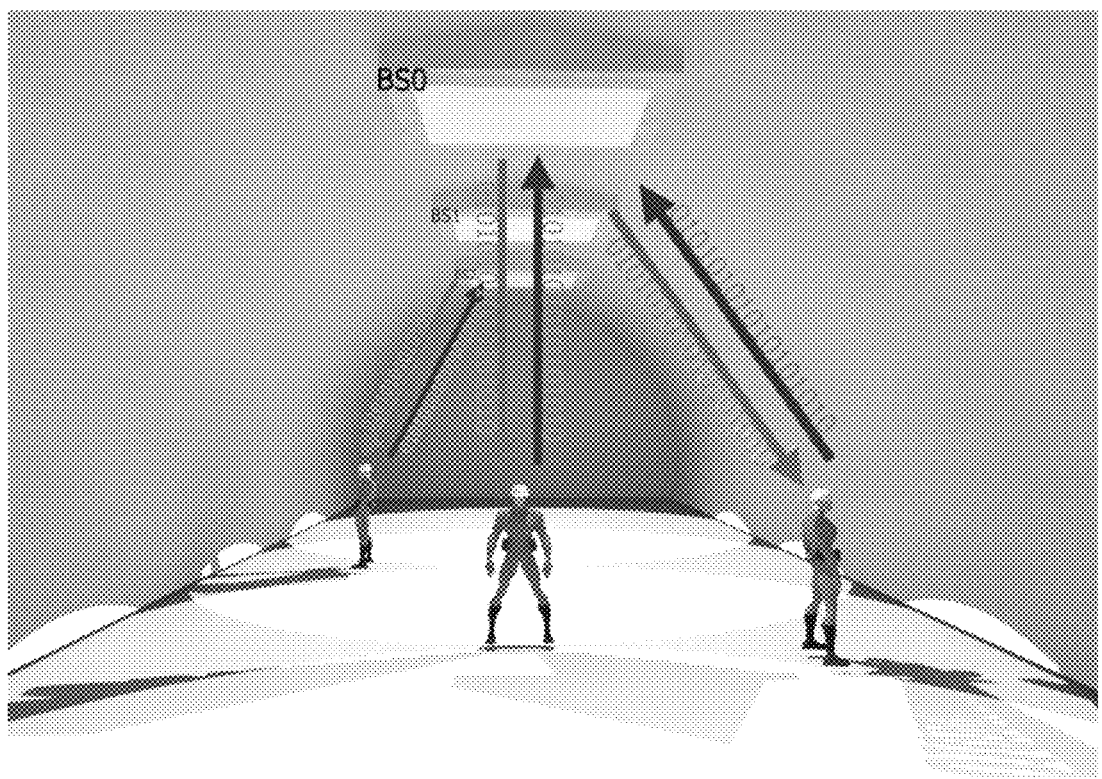
FIG. 6 shows a deployment of receivers in the ceiling of an underground mine tunnel, in one of the arrangements of the present invention.

FIG. 6 shows the display on the ceiling of the receivers that will operate at frequencies of tones corresponding to the RGB and thus ensure a full-duplex communication, that is to say that each element can transmit and receive information.

The transceiver used in a tunnel, in conditions of the communication channel under the noise conditions described above, is a bidirectional transceiver that allows bidirectional communication.

The purpose of the transceiver is to be able to be attached to people, machines and devices that need to communicate using data, voice or video with a monitoring station in a ubiquitous environment represented by an underground tunnel. For this, there are transceivers made up of LEDs and D-SLR.

Figure 7:
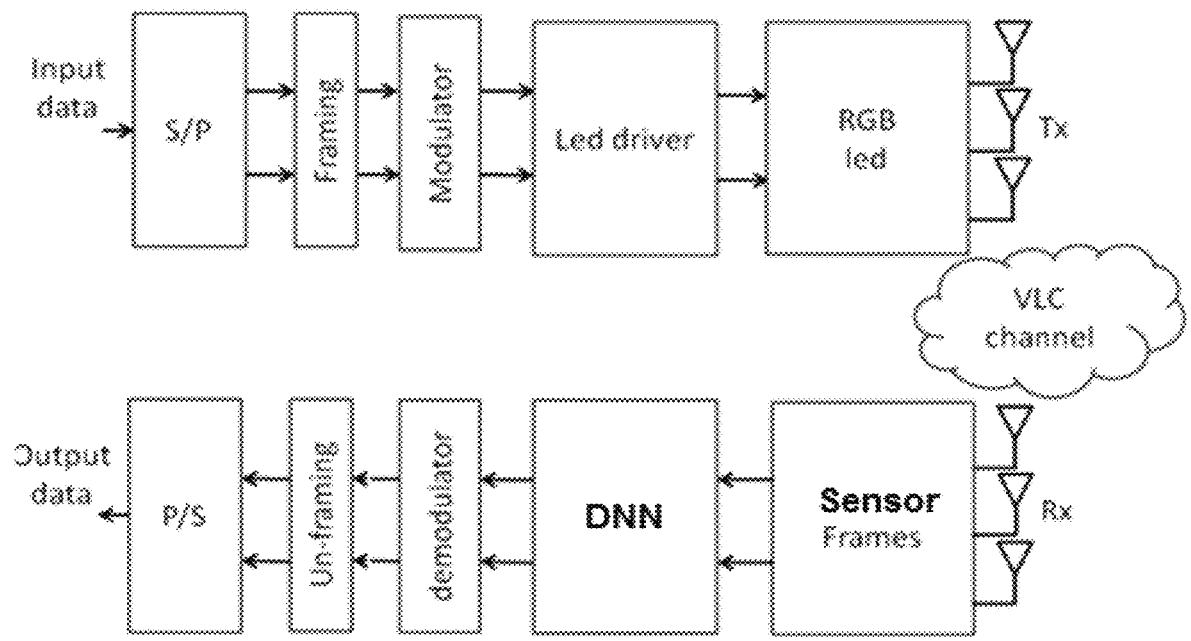
FIG. 7 shows a block diagram of the transceiver circuit of the present invention.

As shown in FIG. 7, the visible light communication system for underground tunnels, such as mining tunnels, is made up of a sequence composed of the cell number and an identifier of a mining worker or an underground machine, which are parallelized by the serial/parallel unit, a data frame is assembled to be processed by the UPSK modulator (Undersampling Phase shifh Keying) to be delivered to the driver or feeder in three tones that activates each of the colors in parallel.

The channel of the tunnel is the one that defines the singularity of the solution not only by the under sampling of the frames that are received by the sensor, composed of an array of photo detectors. But because of the nature of the channel inside the tunnel.

On the receiving side downstream the sensor that detects the frames, a Deep Neural Network (DNN) is used to represent the inverse of the channel for each of the colors and to clean the signals that are presented to the demodulator. Then, the accompanying symbols are removed and delivered to the unit that returns them to their serial version. With this, the noise is cleaned from the colors, thus creating a clean data and without noise, which returns it to its normal state, that is, as if it were communicating through visible light, but at surface level.

These symbols are sent by the VLAN to the command center to determine in which cell each of the operators and equipment that are connected to the system. And in this way exercise control of the assets and manage the powers of the system.

The system of communication through visible light, requires a serial/parallel converter, where the framing stage, the coding stage, the modulation stage, use an under sampling phase shift on-off keying (UPSOOK), the driver or feeder of the three or more LEDs and an RGB LED and the transmission end are connected to the main chipset, the chipset controlled centrally by the master.

The receiver portion of the video frames, is captured in an array (Digital-SLR, with SLR of the English Single Lens Reflex), a module of a Neural Network DNN, a demodulator, a module to decode, module for the unframe delimiter. A parallel/serial converter and the transmission end are connected to the main chipset, where chipset controlled centrally by the master.

The communication system for visible light requires software to control the physical layer, which performs the link layer procedures using the VDHL language, the transport layer, the application layer program using the C language. Programs are stored in the main chipset, and can be updated through wireless communication.

The communication system by visible light, in the case of an underground tunnel, where the LED transducer can be placed in the machine, the control circuit, power modules and gas sensors, temperature sensors, identification sensors and the optical detector of the LED light source. The LED lamp is fixed to the top or roof of the underground tunnel, which is connected to the fiber optic cable; The LED transceiver is placed on the other end of the machine. This can be done using a rechargeable lithium battery.

The process to realize the communication through visible light in an underground tunnel, in an optical data transmission, in which to transmit the data between a transmitter (TX) and a receiver (RX) a stage is planned to operate on the basis an UPSK modulator (Under sampling Phase shift Keying), a plurality of elementary and equalization colors using a DNN, for the calibration and transmission of information. For this, a succession of elementary colors is sent by at least one corresponding source of optical radiation on the emitter side (Ti, Tj, Tk) and on the receiving side is received by at least the corresponding optical radiation receiver (Ri, Rj, Rk).

To obtain the inverse of the communications channel, a technique based on Artificial Neural Networks, called DNN (Deep neural networks) is used. The DNN is able to learn more precisely all the possibilities and clustering around the allowed classes.

Due to this characteristic, said artificial neural networks can transform the captured data from the communication channel corresponding to data, image and video streams in centroids or classes.

DNNs are trained in such a way that an input value can be connected to an output. In the present invention, said input value corresponds to a value obtained from the channel's streams, while the output value refers to a class of the respective parameter.

The decision making of the class to which the estimated symbols belong is done by means of a sub-routine of operation, which begins with the recovery of the data from the channel and compared with a data stored in a defined address on the hard disk of the computer.

From that class decision, an estimated value is obtained for each RGB color and delivered to the demodulator.

To model the channel inside the tunnel, it is necessary to use the following mathematical formulation:

The modeling of the channel is based on the equations proposed by the authors [13], [14] for an optical communication link $$H_{LOS}(0) = \begin{cases} \frac{(m+1)A}{2\pi D_d^2}\cos^m(\phi)T_s(\psi)g(\psi)\cos(\psi) & si\, 0 \leq \psi \leq \psi_c \\ 0 & si\, \psi > \psi_r \end{cases} \quad (1)$$

$H_{LOS}$: Channel gain in direct line
where:
A: PD detector area.
$D_d$: Distance between transmitter and receiver.
$\psi$: Angle of incidence.
$\phi$: Angle of irradiance.
$T_s(\psi)$: Gain of the optic filter.

$g(\psi)$: Gain of the optic concentrator.
$\psi_c$: Field of vision in a receiver.
The Lambertian emission order m can be determined using the equation [15]:

$$m = -\frac{\ln 2}{\ln(\cos\Phi_{1/2})} \quad (1)$$

where $\Phi_{1/2}$ is the angle of medium power of the transmitter.
The optic concentrator is modelled by the following equation:

$$g(\psi) = \begin{cases} \frac{n_r^2}{\sin^2(\psi_c)} & si\, 0 \le \psi \le \psi_c \\ 0 & si\, \psi > \psi_c \end{cases} \quad (2)$$

Where $n_r$ is the refraction index.
The mathematical model of the channel model considers the implementation of a VLAN (virtual local area network) in an underground mine, using a multi-user and multi-channel wireless communication, represented in FIG. 6. The working area will be covered by M cells. Each cell has k channels that provide wireless communication through VLC to N users.
The power received by the user n from the channel is described by:

$$P_{k,n}^{Rx} = R_{PD} H_{k,n} P_{k,n}^{Tx} \quad (3)$$

where:
$P_{k,n}^{Tx}$: Power transmitted to the user n in channel k.
$R_{PD}$: PD responsiveness.
$H_{n,k}$: Gain of the channel k to the user n.
Each user is affected by the interference caused by the existence of other users in neighboring channels. This channel interference i to the user j is expressed as the total interference $\sigma$, mathematically described by:

$$\sigma_{i,j} = \sum_{n=1}^{N-1} \sum_{k=1}^{K-1} R_{PD} H_{k,n} P'_{k,n} con\, k, n \ne i, j \quad (4)$$

Where $P'_{k,m}$ is the power of interference.
The signal to noise ratio with interference (SINR) for each user using the channel can be expressed with: nnkk $$\gamma_{k,n} = \frac{R_{PD} H_{k,n} P_{k,n}}{\sigma_{k,n} + \eta} \quad (5)$$

where $\eta$ is the accumulated power of noise and its value results from the equation:

$$\eta = 2qR_i I_{amb} B + \frac{4K_B TB}{R_F} \quad (6)$$

where:
$q = 1.6 \times 10^{-19}$ [C.]

$I_{amb}$: Light intensity of the environment.
$K_B$: Boltzmann constant
B: Noise equivalent bandwidth
T: Absolute temperature
$R_F$: Gain from the impedance amplifier.
The capacity in each channel at all time for t is expressed by: t=1, 2, . . . , Tt=1, 2, . . . , T $$R^t = \sum_{k=1}^{K} \sum_{n=1}^{N} \log_2\left(1 + \frac{R_{PD} H_{k,n}^t P_{k,n}^t}{\sigma_{k,n}^t + \eta}\right) \quad (7)$$

Figure 8:
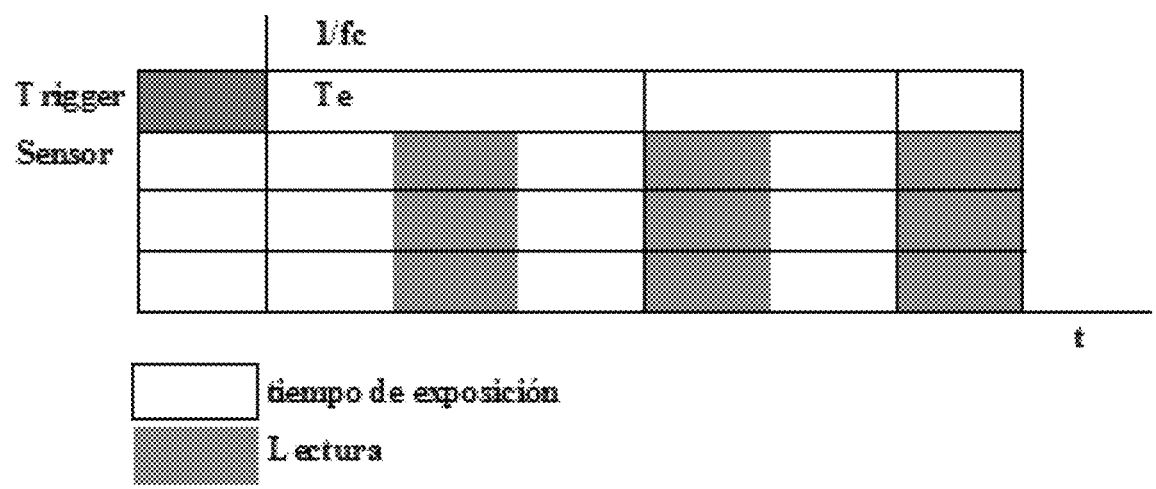
FIG. 8 shows one single frame in the composition of frames for usage of the channel modelling.
Figure 9:
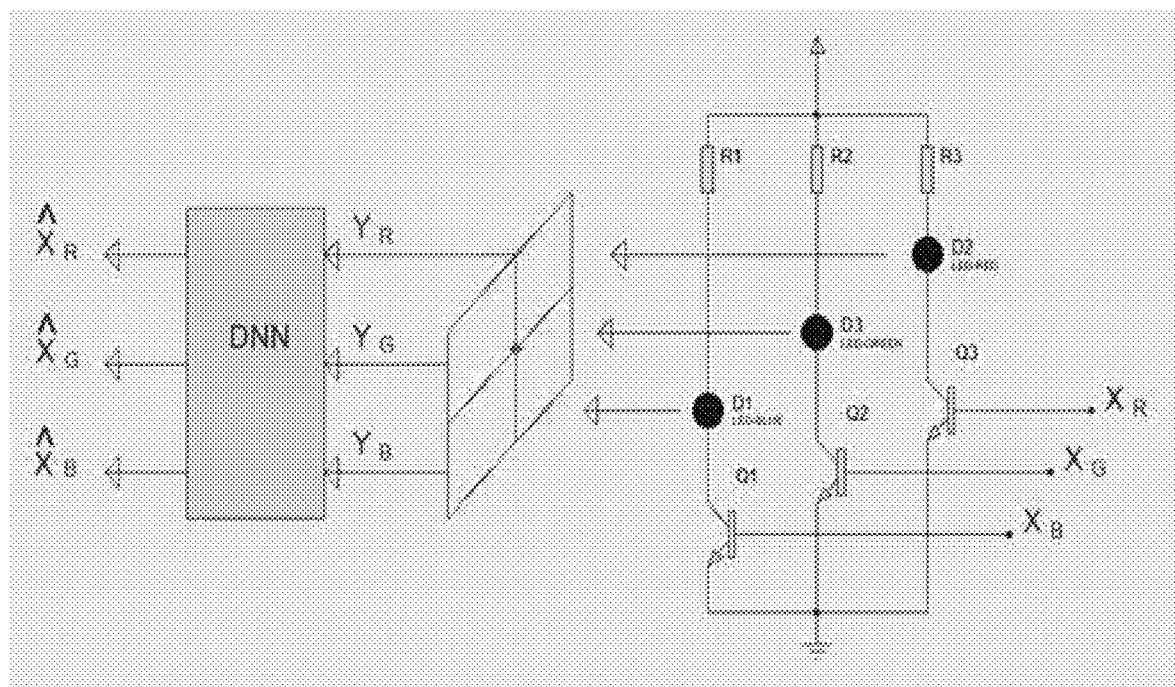
FIG. 9 shows RGB LEDs, receiving circuit and channel, used in the present invention.

Equation (8) shows the capacity of the channel at each moment of time that depends on the received power and noise. Extending the extended analysis considering T instants of time, the equation can be written as:
The matrix that can be optimized is the channel gain $H_{n,k}$ or the transpose that is the same, which can be pre-multiplied by a channel encoder and post-multiplied by an equalizer.
FIG. 8 shows the frame between the transmitter and the transceiver sensor for a color, where fc is the camera's sweep frequency and the exposure time required by the Shutter effect.
FIG. 9 shows the RGB LEDs, how the photons travel along the channel and reception circuit, composed of an equalizer. The DNN equalizer is a filter that is used to assist in the demodulation process, after which symbols that accompanied the input data are removed and serialized for processing by the operations center located on the surface of the mine.
To deal with the problem of down-link optimization, the mathematical approach for multi-user multi-channel connection using VLC was previously carried out. The optimization problem can be defined as maximizing the capacity of the channel, this is:

$$\max R = \sum_{t=1}^{T} \sum_{k=1}^{K} \sum_{n=1}^{N} x_n^t \log_2\left(1 + \frac{R_{PD} H_{k,n}^t P_{k,n}^t}{\sigma_{k,n}^t + \eta}\right) \quad (8)$$

The capacity of the channel must be subject to a minimum quality of service which represents a restriction for the maximization problem. Minimum service quality is given by:

$$\sum_{k=1}^{K} \sum_{n=1}^{N} H_{k,n}^t \cdot P_{k,n}^t \le \Gamma \; \forall t \quad (9)$$

That is, interference is limited in every moment in each channel to a value of $\Gamma$ Also, transmission powers have to be positive, that is:

$$P_{k,n}^t \ge 0 \; \forall t \quad (10)$$

Data transmission is conducted by packets in $T_p$ moments of time, that is, T total moments of time where user n is at most served $T_p$ moments. This is formally expressed as:

$$T_p = \sum_{t=1}^{T} x_n^t \le T/T \wedge T_p \in \{Q^+\} \quad (11)$$

The optimization problem is then formally defined as:

$$P_0: \max R = \sum_{t=1}^{T}\sum_{k=1}^{K}\sum_{n=1}^{N} x_n^t \log_2\left(1 + \frac{R_{PD}H_{k,n}^t P_{k,n}^t}{\sigma_{k,n}^t + \eta}\right) \quad (12)$$

$$\text{s.t.:} \sum_{k=1}^{K}\sum_{n=1}^{N} iH_{k,n}^t \cdot P_{k,n}^t \leq \Gamma; \forall t \quad (13)$$

$$P_{k,n}^t \geq 0; \forall t \quad (14)$$

$$\sum_{t=1}^{T} x_n^t \leq T_P; \quad x^t \in \{0,1\} \quad (15)$$

To solve the problem, we will use a decomposed method where the original problem for instants of time T is solved in a static way for each t finding the optimal power by means of a polynomial function and the combinatorial variable by means of a metaheuristic algorithm. Intelligent (in this case the genetic algorithm is used).

The approach of the up-link optimization problem, is considered the base stations b located in the roof of the environment to communicate. Each user will have a fixed k channel. The power received by each of the base stations is expressed as:

$$P_{b,n}^{Rx} = R_{PD}H_{b,n}P_n^{Tx} \quad (16)$$

where:

$P_{k,n}^{Tx}$: Power transmitted to the user n to the base station b.

$R_{PD}$: PD responsiveness.

$H_{b,n}$: Gain in user channel n to the base station b.

The optimization problem for the uplink is then formally defined as:

$$P_0: \max R = \sum_{b=1}^{B}\sum_{n=1}^{N} \log_2\left(1 + \frac{R_{PD}H_{b,n}P_n}{\sigma_{b,n} + \eta}\right) \quad (167)$$

$$\text{s.t.:} \sum_{b=1}^{B}\sum_{n=1}^{N} H_{b,n} \cdot P_n \leq \Gamma; \forall t \quad (18)$$

$$P_n \geq 0; \forall t \quad (19)$$

The power transmitted by each of the transmitters is constant, so to maximize the channel capacity and, consequently the bandwidth, two variables are important $H_{b,n}$ and $\sigma_{b,n}$ which are the channel gain and the inter-channel interference.

To solve the optimization problem in Down-link the equations described from (12) to (15), two methodologies will be used. The first consists of decomposing the problem in T convex optimization problems and finding the powers assigned to each user for each channel in a polynomial way. The second methodology corresponds to the compound problem, that is, to solve the optimization problem directly It should also be noted that given the nature of the decision variable $x_n^t$ in the case of the up-link it is not necessary to decompose because the problem is simpler.

For each moment of time t in which there is user attention n, that is, the optimization problem $x_n^t=1$ is solved:

$$P_1: \max R^t = \sum_{k=1}^{K}\sum_{n=1}^{N} \log_2\left(1 + \frac{R_{PD}H_{k,n}^t P_{k,n}^t}{\sigma_{k,n}^t + \eta}\right) \quad (20)$$

$$\text{s.t.:} \sum_{k=1}^{K}\sum_{n=1}^{N} H_{k,n}^t \cdot P_{k,n}^t \leq \Gamma \quad (21)$$

$$P_{k,n}^t \geq 0 \quad (22)$$

The problem proposed is then converted into a convex problem. It is solved using Lagrange multipliers, which is a particular case of the Karush-Kuhn-Tucker conditions:

$$L(P_{k,n}^t, \lambda) = \sum_{k=1}^{K}\sum_{n=1}^{N} \log_2\left(1 + \frac{R_{PD}H_{k,n}^t P_{k,n}^t}{\sigma_{k,n}^t + \eta}\right) \quad (23)$$

$$+\lambda\left(\Gamma - \sum_{k=1}^{K}\sum_{n=1}^{N} H_{k,n}^t \cdot P_{k,n}^t\right) \quad (24)$$

$$\frac{\partial L}{\partial P_{k,n}^t} = 0 \wedge \frac{\partial L}{\partial \lambda} = 0 \quad (25)$$

When the system of equations is solved, for each moment of time t optimum power emitted by LEDs is:

$$P_{k,n}^+ = \left[\frac{1}{\lambda H_{k,n}^t \ln 2} - \frac{\sigma_{k,n}^t + \eta}{R_{PD}H_{k,n}^t}\right]^+ \quad (26)$$

where:

$$\lambda = \frac{R_{PD}KN}{\left(R_{PD}\Gamma + \eta KN + \sum_{k=1}^{K}\sum_{n=1}^{N}\sigma_{k,n}^t\right)\ln 2} \quad (27)$$

The power is obtained in a polynomial way, however, $x_n^t$ is a discrete variable so the problem will be reduced to find the matrix $X_n^t$ that has a better performance reducing the number of variables of the problem.

Since the channel capacity obtained using the broken-down problem delivers better results, this methodology is used for optimization.

The invention claimed is:

1. A communication system through visible light, where the visible light transmission channel, has abnormal conditions, in tunnels of an underground mine with a high concentration of dust in the environment, and in rural tunnels and urban, where the smoke that could be produced from an accident, produces high concentrations of pulverulent material in the transmission channel, which has a number of cells, based on the lighting of an array of light emitting diodes (LEDs) and a Digital-Single Lens Reflex (D-SLR), located on the roof of the tunnel and transceiver of LED/D-SLR connected to people or vehicles inside the tunnel, WHEREIN the communication system includes:
   (a) a transmitting device for transmission, comprising
      (a1) an enter data port;
      (a2) a serial/parallel data converter;
      (a3) a data frames generator to create a data frame;
      (a4) an Undersampling Phase Shift Keying (UPSK) modulator to modulate the data frame;
      (a5) a LED feeder or driver;

(a6) a decomposer providing a breakdown device to breakdown the LED signal in three colors, red, green, and blue (RGB), to activate all three colors in parallel; and (a7) a transmitter;

(b) a visible light communication channel;

(c) a receiver comprising (c1) a receiving device;

(c2) a data frame sensor;

(c3) a Deep Neural Network (DNN) to represent the inverse of the channel for each of the RGB colors and to remove the accompanying symbols of the RGB data, for cleaning the signals;

(c4) a demodulator;

(c5) a breakdown component to breakdown frames to return data to their serial version;

(c6) another serial/parallel data converter to provide clean output data; and (c7) a data output port.

2. The communication system through visible light, according to claim 1, WHEREIN the UPSK modulator, driver or LED feeder of the three or more LEDs and the RGB LED and the transmitting device connected to a main chipset, where the chipset is controlled centrally by a master.

3. A communication method through visible light, where the visible light transmission channel, has abnormal conditions, in tunnels of an underground mine with a high concentration of dust in the environment, and in rural tunnels and urban, where the smoke that could be produced by an accident, produces high concentrations of pulverulent material in the transmission channel, which has a number of cells, based on the lighting of an array of light emitting diodes (LEDs) and a Digital-Single Lens Reflex (D-SLR), located on the roof of the tunnel and transceivers of LED/D-SLR connected to people or vehicles inside the tunnel, WHEREIN the communication method comprising the following stages:

(a) transmitting data according to the following steps:

(a1) entering data from the location of a roof transceiver and the location of transceivers of people or people and vehicles within the tunnel;

(a2) creating of a sequence that includes the number of the cell and an identifier for people or machines within the tunnel;

(a3) creating frames to build a data frame;

(a4) modulating the data frame;

(a5) directing the LEDs to a decomposer providing a breakdown device;

(a6) breaking down the LED signal in three colors red, green, and blue (RGB), to activate all three colors in parallel; and (a7) transmitting a frame of colors;

(b) sending the frame of colors using a visible light communication channel;

(c) receiving the frame of colors according to the following steps:

(c1) retrieving the frame of colors;

(c2) detecting the frame of colors;

(c3) representing the inverse of the channel for each of the RGB colors, removing the accompanying symbols of the RGB data, and cleaning the signals by using a Deep Neural Network (DNN);

(c4) demodulating the frame of colors;

(c5) breaking down data in the data frame to return them to their serial version;

(c6) converting serial/parallel data as to deliver clean output data; and (c7) providing data output.

* * * * *